Figure 1:
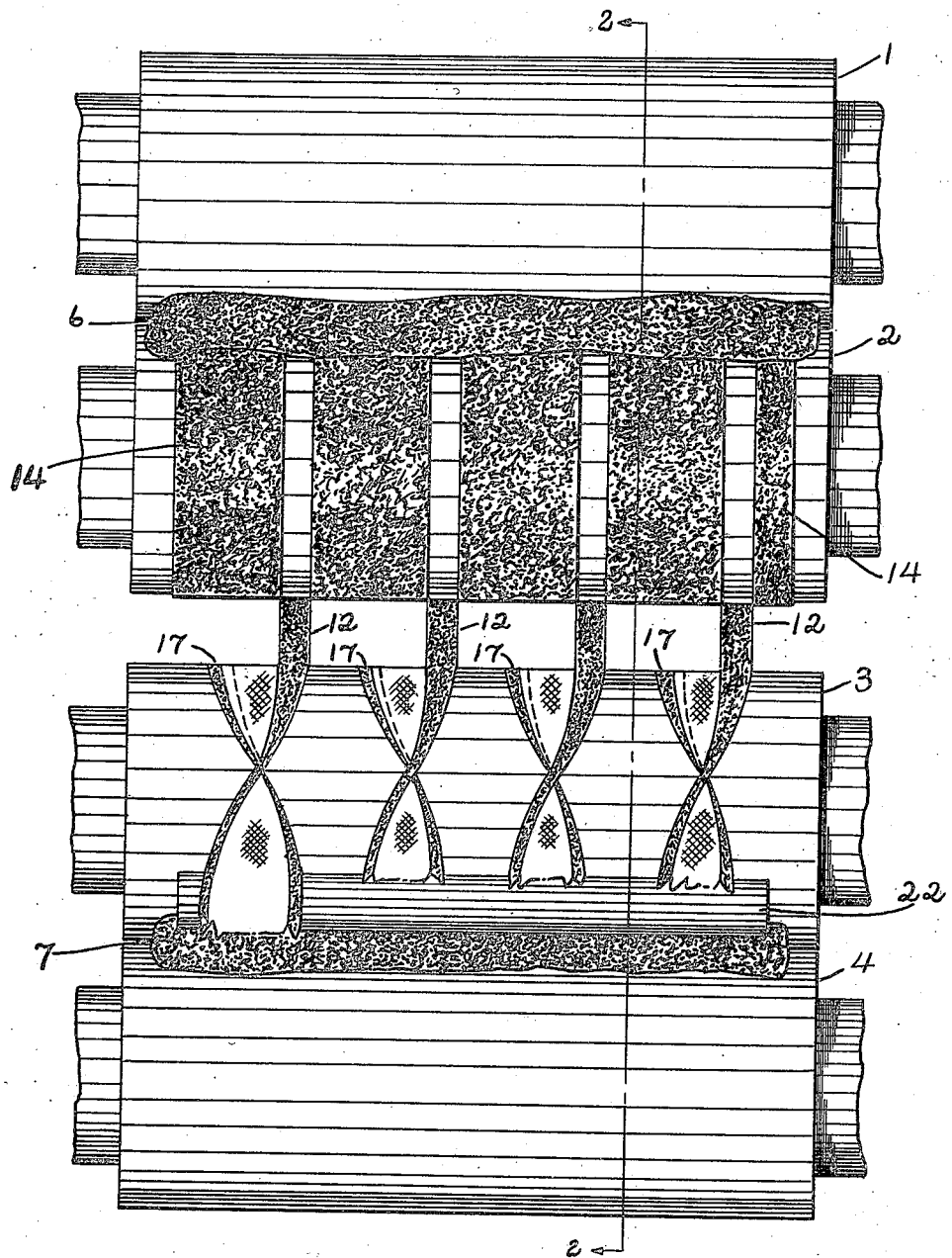

Dec. 6, 1927.  1,651,794
G. F. WIKLE
LAMINATED MATERIAL
Filed Dec. 12, 1925    2 Sheets-Sheet 1

GEORGE F. WIKLE
INVENTOR.

BY
ATTORNEY

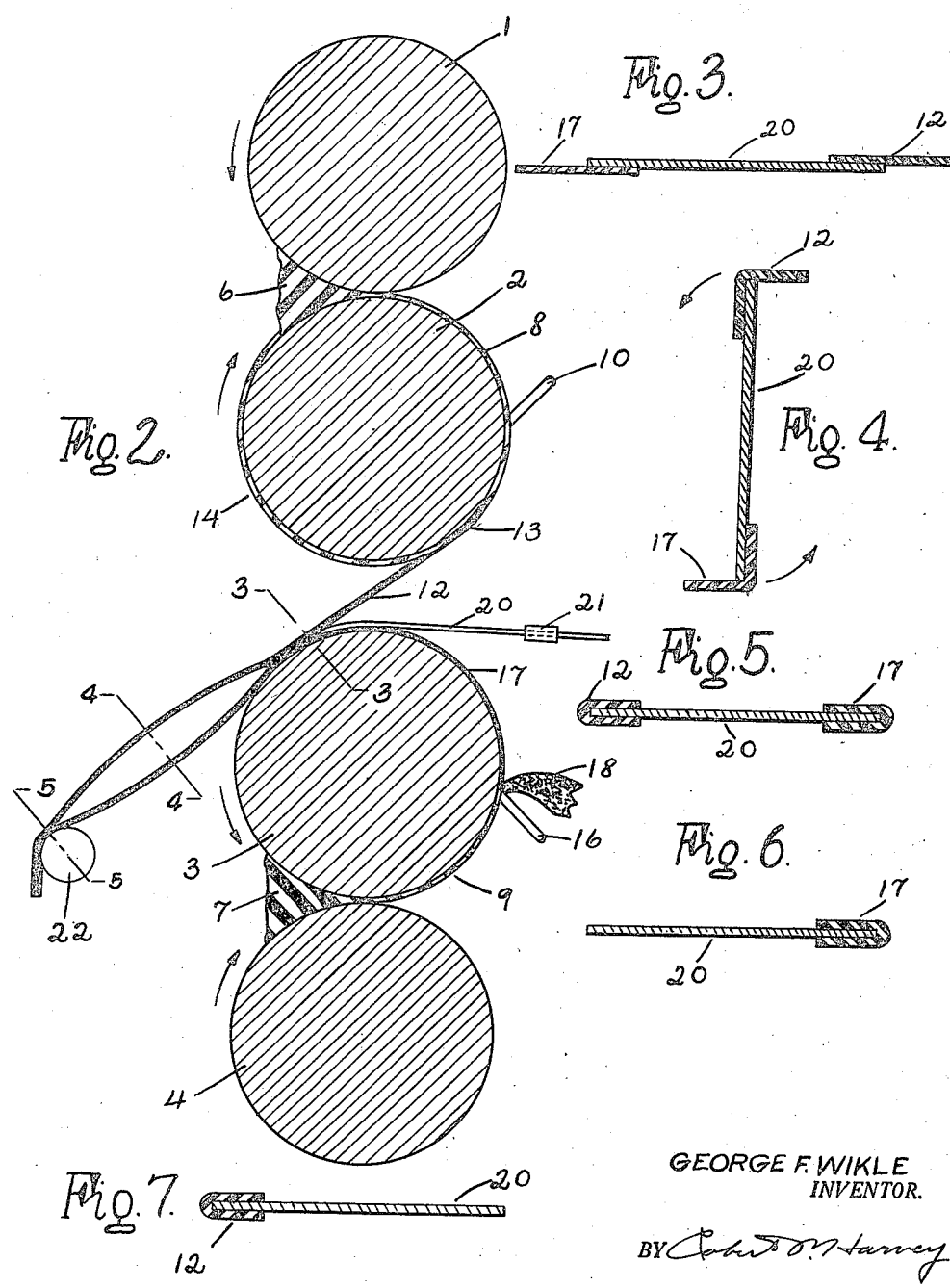

Patented Dec. 6, 1927.

1,651,794

UNITED STATES PATENT OFFICE.

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

LAMINATED MATERIAL.

Application filed December 12, 1925. Serial No. 75,037.

My invention relates to the manufacture of laminated strips, such as are used in the construction of pneumatic tire casings for example, and more particularly to a method of covering one or both edges of a web of material with rubber or the like.

It is among the objects of my invention to provide a method by which a strip of rubber or the like may be folded about one or both edges of a fabric or other web without the use of complicated mechanical instrumentalities. A further object is to provide a method of the character described which may be carried out at the calender on which the rubber or like strip is formed and as part of the calender operation.

Other and further objects will be apparent from the following specification and claims.

In the accompanying drawings which illustrate one manner of carrying out my invention Figure 1 is a front view of a four-roll calender as used in carrying out my invention, Figure 2 is a section on lines 2—2 of Figure 1, Figures 3, 4, and 5 are diagrammatic sections showing the steps in applying a rubber strip to both edges of a strip of material and are taken substantially on lines 3—3, 4—4, and 5—5 of Figure 2; and Figures 6 and 7 show the rubber applied to but one edge of the strip.

Referring to the drawings the rolls of the calender are designated as 1, 2, 3 and 4. These rolls are driven in the direction of the arrow in Figure 2, in any conventional manner. Banks of rubber 6 and 7 are formed respectively between rolls 1 and 2, and 3 and 4 and sheeted out on rolls 2 and 3 in a well known manner. The rubber sheets are indicated at 8 and 9.

The sheet 8 on roll 2 is cut by knives 10 into spaced strips 12 which are led from roll 2 at 13, the surplus rubber 14 being permitted to continue with the roll back to bank 6.

The sheet 9 on roll 3 is cut by knives 16 into spaced strips 17 which are allowed to remain on the roll, the surplus rubber 18, between the strips 17, being removed as indicated in Figure 2. This surplus rubber may be collected for reworking or brought down to roll 4 which will return it to bank 7.

As is clearly shown in Figure 1 the strips 12 and 17 are so cut as to be offset from each other. Webs of fabric, or other material, 20 are drawn from suitable sources of supply, not shown, to overlap strips 17 on roll 3, and strips 12 are applied in overlapping relation to the upper side of the webs as clearly shown in Figures 3 and 4. Suitable guides as 21 may be provided to accurately position webs 20. The assembled strips and webs as they leave roll 3 are twisted through an angle of 180° as shown in Figures 1 and 2 and 3 to 5 inclusive, and then led downward over a roll 22 to any suitable type of wind-up mechanism not shown. The twisting is accomplished at the start of the operation, the forward ends of the rubber and fabric strips as they are drawn from the calender being turned through 180° and drawn over the roll 22 and thence to the wind-up. The restraint of calender roll 3, and roll 22 if used, causes the strips to thereafter follow the twisted path. As the web is turned up on edge the free portions of the rubber strips are drawn into a horizontal position as shown in Figure 4 and as the web completes the 180° turn the free edge is laid down upon the opposite face of the web, completing the operation as shown in Figure 5. In certain cases it may be desired to apply a rubber strip to but one edge of the web and this result may be obtained by omitting either bank 6 or 7 with the rubber strip supplied therefrom. Figure 6 shows the result when bank 6 is omitted while Figure 7 shows the result of omitting bank 7.

While I prefer to form the rubber strips at the time they are applied it is evident that the rubber strips may be preformed and fed into assembled relation with web 20 from reels or other suitable means.

It will also be understood that by varying the initial amount of overlap of the rubber strips and webs a greater width of rubber may be applied to one face of the web than to the other.

I claim:

1. The method of enclosing an edge of a web of material, which comprises applying a strip of material in overlapping relation to such edge, advancing the assembled web and strip, and twisting the assembly through an angle of substantially 180° to wrap the strip about the edge of the web.

2. The method of enclosing an edge of a web of material which comprises applying a strip of material in overlapping relation to such edge, advancing the assembled web and strip over a support and twisting the assembly through an angle of substantially 180° as it leaves the support, to wrap the strip about the edge of the web.

3. The method of enclosing an edge of a web of material which comprises applying a strip of material in overlapping relation to such edge, advancing the assembled web and strip over two spaced supports and twisting the assembly through an angle of substantially 180°, as it passes from one support to the other, to wrap the strip about the edge of the web.

4. The method of enclosing the edges of a web of material which comprises applying a strip of material in overlapping relation to each edge of the web, the strips being applied to opposite faces of the web, advancing the assembled web and strips and twisting the assembly through an angle of substantially 180° to wrap the strips about the respective edges of the web.

5. The method of enclosing the edges of a web of material which comprises applying a strip of material in overlapping relation to each edge of the web, the strips being applied to opposite faces of the web, advancing the assembled web and strips over two spaced supports and twisting the assembly through an angle of substantially 180° as it passes from one support to the other to wrap the strips about the respective edges of the web.

6. The method which comprises forming a rubber strip on a calender, applying a web of material in overlapping relation with said strip on one of the calender rolls and turning the assembled web and strip through an angle of 180° as it leaves said calender roll to wrap the rubber strip about the edge of the web.

7. The method which comprises forming rubber strips respectively on two adjacent rolls of a calender, applying a web of material in overlapping relation with the strip on one of said calender rolls, bringing the rubber strip from the second of said rolls into overlapping relation with the opposite edge of the web while the latter is on the first mentioned calender roll and turning the assembled web and strips through an angle of 180° as it leaves said calender roll to wrap the rubber strips about the respective edges of the web.

8. The method which comprises forming rubber strip on a calender, applying a web of material in overlapping relation with said strip on one of the calender rolls, leading the assembled web and strip over a support spaced from said roll and twisting the assembly through an angle of 180° as it passes from said roll to the support, to wrap the rubber strip about the edge of the web.

9. The method which comprises forming rubber strips respectively on two adjacent rolls of a calender, applying a web of material in overlapping relation with the strip on one of said calender rolls, bringing the rubber strip from the second of said rolls into overlapping relation with the opposite edge of the web while the latter is on the first mentioned calender roll, leading the assembled web and strips over a support spaced from said first mentioned calender roll and twisting the assembly through an angle of 180° as it passes from the calender to the support, to wrap the rubber strips about the respective edges of the web.

In testimony whereof I have signed my name to the above specification.

GEORGE F. WIKLE.